US009356953B2

(12) United States Patent
Efrati (10) Patent No.: US 9,356,953 B2
(45) Date of Patent: May 31, 2016

(54) SYSTEM AND METHOD TO PREVENT SPOOFED COMMUNICATION THROUGH OUT-OF-BAND VERIFICATION (71) Applicant: Vonage Network LLC, Holmdel, NJ (US)

(72) Inventor: Tzahi Efrati, Hoboken, NJ (US)

(*) Notice: Subject to any disclaimer, the term of this patent is extended or adjusted under 35 U.S.C. 154(b) by 75 days.

(21) Appl. No.: 14/062,344

(22) Filed: Oct. 24, 2013

(65) Prior Publication Data

US 2015/0121480 A1    Apr. 30, 2015

(51) Int. Cl.
  *H04L 29/06* (2006.01)
  *H04W 4/12* (2009.01)
  *H04W 12/12* (2009.01)

(52) U.S. Cl.
  CPC ............. *H04L 63/1466* (2013.01); *H04W 4/12* (2013.01); *H04W 12/12* (2013.01)

(58) Field of Classification Search
  None
  See application file for complete search history.

(56) References Cited

U.S. PATENT DOCUMENTS

| 2004/0015536 | A1* | 1/2004 | Cohen et al. ................. 709/200 |
| 2004/0260778 | A1* | 12/2004 | Banister et al. ............. 709/206 |
| 2009/0055919 | A1* | 2/2009 | Komura et al. ................ 726/11 |
| 2010/0027543 | A1* | 2/2010 | Rustagi et al. ............... 370/392 |
| 2011/0149932 | A1* | 6/2011 | Kim et al. .................... 370/338 |
| 2012/0259925 | A1* | 10/2012 | Braudes ....................... 709/206 |

* cited by examiner

*Primary Examiner* — Hadi Armouche
*Assistant Examiner* — Andrew Steinle
(74) *Attorney, Agent, or Firm* — Duane Morris LLP; Joseph Pagnotta (57) ABSTRACT

The disclosed subject matter addresses the problem of spoofing by directly and transparently communicating with the apparent sender of the potentially spoofed incoming message or with the communications network handing the communication of the potentially spoofed incoming message. The address of the recipient device of the potentially spoofed incoming message is compared with addresses of communication sent from the apparent sender. As a result of this comparison, it may be determined whether the phone call or message was sent from the apparent source or was spoofed. The times associated with messages sent from the indicated sender and times associated with the incoming message may also be used to determine the authenticity of the apparent sender. The recipient is of the incoming message is notified of a spoofed message.

18 Claims, 6 Drawing Sheets

SYSTEM AND METHOD TO PREVENT SPOOFED COMMUNICATION THROUGH OUT-OF-BAND VERIFICATION

BACKGROUND

In addition to Telecommunication services, many communication networks support electronic messaging services, for example and without limitation, Short Message Service (SMS), Multimedia Message Service (MMS), voicemail, or email. Typically, elements of the network use indicia of source and destination addresses (for example, directory numbers, IP addresses, e-mail addresses or the like) extracted from the message header to process the message or call. For example the networks may use source and destination addresses extracted from the message header for routing, billing, caller ID or other purposes.

Increasingly, a problem encountered in the field of messaging is the practice of message 'spoofing' (i.e., a sending party prefacing its messages on calls with a falsified source address) so as to appear to originate from a sender other than the true sender and thereby disguise the identity of the true sender. For example, message spoofing may be practiced in the context of "spam" messages to mislead the receiving party as to the source of the message. As another example, spoofing technology can be used by an imposter to grant access to a spoofed party's voicemail account. Message spoofing might also be practiced in attempt to divert or impede billing for electronic messaging services.

Phishing also may be implemented by spoofing; in this deception an attacker masquerades an electronic communication as being from a trusted entity in an attempt to lure recipients into divulging sensitive information such as usernames, passwords and credit card details. Phishing often requests users to enter details that may later be used to access the user's financial or personal information. Attackers can then use data such as login credentials to access an actual account and otherwise use confidential information entered innocently by the unsuspecting user.

SMS spoofing is a relatively new practice which uses the (SMS), available on most mobile phones and personal digital assistants, to set who the message appears to come from by replacing the originating mobile number (Sender ID) with alphanumeric text. Spoofing has both legitimate uses (setting the company name from which the message is being sent, setting your own mobile number, or a product name) and illegitimate uses (such as impersonating another person, company or product).

The Global System Mobile industry has identified a number of potential fraud attacks on mobile operators that can be delivered via abuse of SMS messaging services. One sure way of detecting and blocking spoofed messages is to screen incoming mobile-originated messages to verify that the sender is a valid subscriber and that the message is coming from a valid and correct location. This can be implemented by adding an intelligent routing function to the network that can query originating subscriber details from the Home Location Register (HLR) or other type of communication network before the message is submitted for delivery. This kind of intelligent routing function however may be beyond the capabilities of legacy messaging infrastructure.

Phone calls may be similarly spoofed, with similar consequences. Caller ID whether on a cell phone, home phone or VoIP phone is typically trusted by users and thus with that trust, a fraudster may exploit it to the user's disadvantage.

While fraudsters normally used spoofed-identities to send messages, there is a risk that these identities may match those of real home subscribers. The risk therefore emerges, that genuine subscribers may be billed for roaming messages they did not send. If this situation occurs, the integrity of the home operator's billing process may also be compromised, with potentially huge impact on the brand. This is a major churn risk to service providers.

The disclosed subject matter presents a novel method of determining the authenticity of the source identifier of the sender in a communication network wherein the incoming message intended for a user includes a source identifier indicating the sender of the incoming message, where the source identifier is subject to possible message spoofing so as to appear to originate from a sender other than the true sender. The method includes extracting the source identifier from the incoming message and obtaining a destination identifier from one or more outgoing messages previously sent from the communication device indicated by the extracted source identifier. The method further comprises comparing the destination identifier and a recipient identifier associated with the user to determine if the source identifier is authentic and notifying the user of the determination.

The disclosed subject matter also presents a novel method of authenticating a sender associated with the source identifier of the received SMS message. The method including extracting the source identifier and providing it to a validation server. The validation server requests information from the communication device indicated or associated with the source identifier. A response from the communication device includes an identification of the recipient of the SMS message and a time stamp associated with the message; and based on the information, the source or sender of the SMS message may be authenticated.

The disclosed subject matter overcomes or mitigates deficiencies of the prior art by advantageously providing an additional layer of security without resorting to the prior art methods and their associated disadvantages as described above. These and many other objects and advantages of the present invention will be readily apparent to one skilled in the art to which the invention pertains from a perusal of the claims, the appended drawings, and the following detailed description of the preferred embodiments.

The following detailed description of preferred embodiments refers to the accompanying drawings, which illustrate specific embodiments of the disclosed subject matter. Other embodiments having different structures and operations do not depart from the scope of the present disclosed subject matter.

DETAILED DESCRIPTION

The disclosed subject matter addresses the problem of spoofing by communicating transparently with the alleged source. In this manner it may be determined whether the phone call or message was sent from the alleged source or was spoofed.

"Communication device," "recipient device," and "device" as used herein in the description include electronic devices that may serve as a source of a message (text or voice) or a phone call to include mobile phones, mobile stations, smart phones, tablets, computers, PDA, digital land line phones, VoIP phones and other types of communication terminals. The use of one of these terms in lieu of another is not meant to be to the exclusion of the other terms unless specifically stated. Similarly, the use of "message" is intended to encompass text or SMS messages, voice mail messages, phone calls or any other types of messaging or communication in which the apparent source is transmitted and made known to the intended recipient of the message. The disclosed subject matter is also intended to operate, without limitation, over packet based communication systems (Internet, Intranets, LAN, etc.), cellular systems, VoIP systems and Public switched telephone networks (PSTN).

Figure 1:
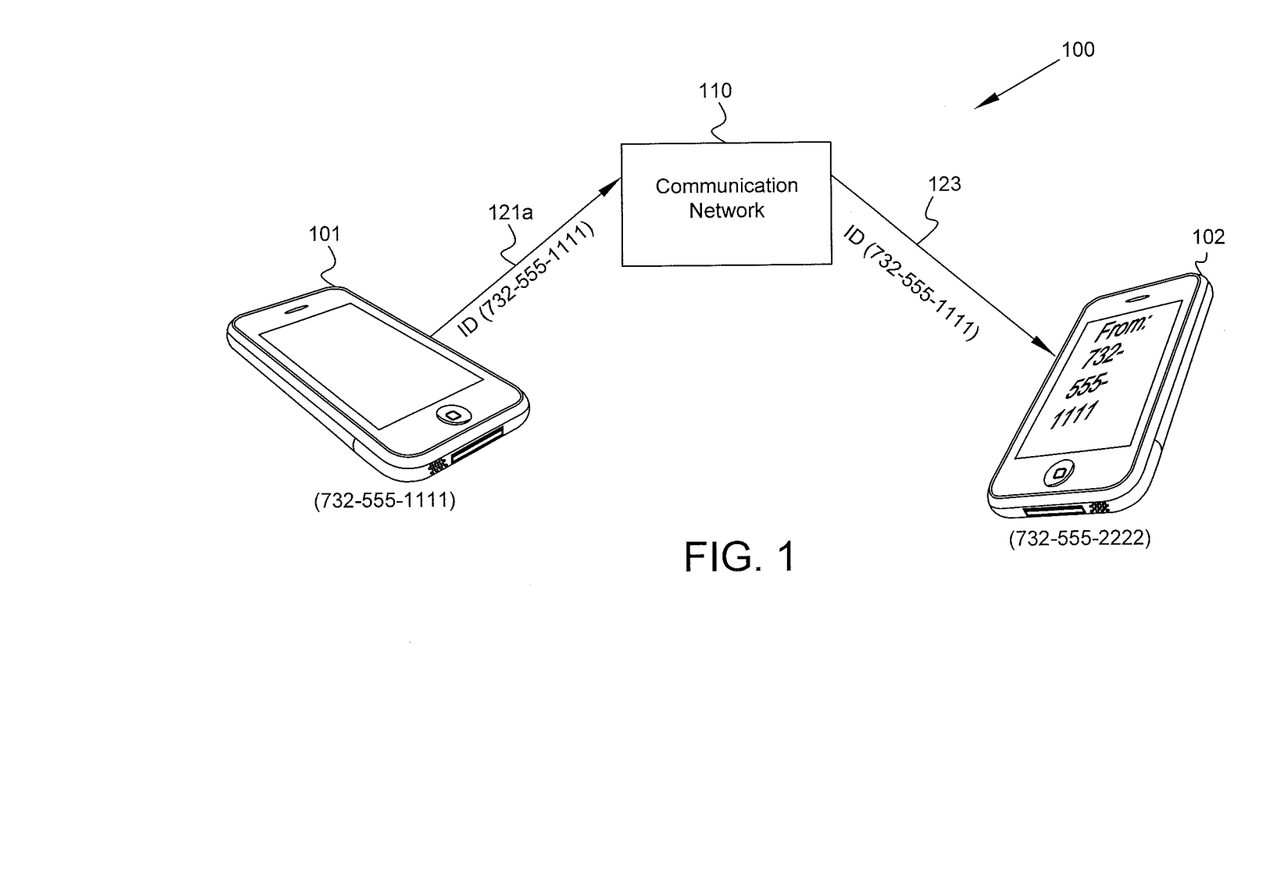
FIG. 1 is an illustration of a non-spoofed communication between a sender and recipient.

FIG. 1 illustrates a non-spoofed communication 100 between a sender and a recipient. The sender's device 101 is associated with telephone number 732-555-1111. During the establishment of a call or through sending a SMS message, message 121a is sent though the communications network 110 with a field that contains a source identifier which indicates the number or address of the calling party or sender 101 device. This first message may be for example an Initial Address Message (IAM), a Session Initiated Protocol (SIP) Invite, or a SMS payload message. The source identifier is also supplied in the message 123 from the communication network 110 to a recipient device 102. The recipient device 102 is associated with telephone number 732-555-2222 which is also the recipient identifier. The recipient device 102 typically displays the source identifier as a number, or identification linked to a number, such as "Mom" or "Office". In some cases, in addition to the source identifier, a source name is also provided with the message which may be displayed, such as a business name.

Figure 2:
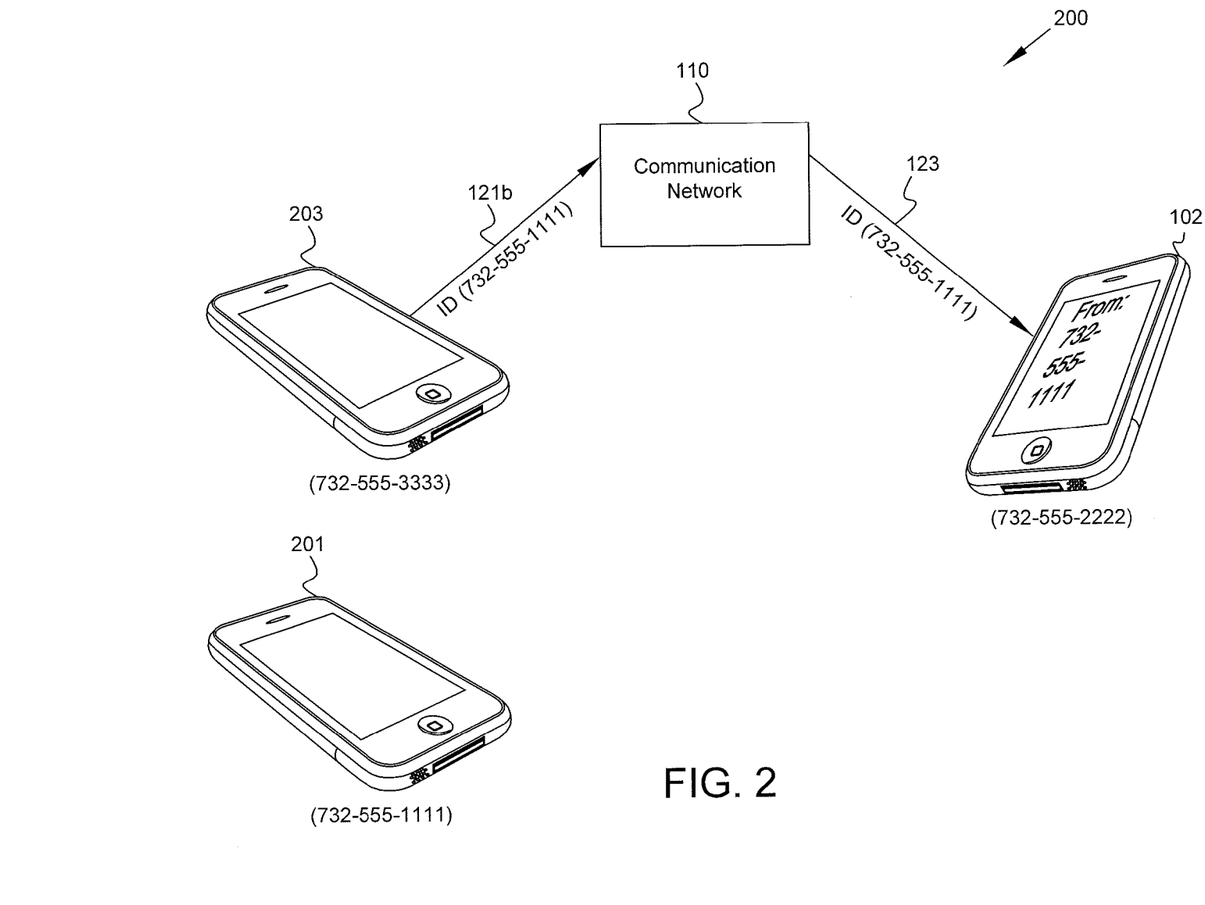
FIG. 2 is an illustration of a spoofed communication between an imposter and a recipient.

FIG. 2 illustrates a communication 200 where the source identifier is spoofed. In this scenario a true sender device 203 is associated with telephone number 732-555-3333. However, the source identifier provided to the communication network 110 and recipient device 102 device in messages 121b and 123 respectively is 732-555-1111 which is the number associated with an apparent sender device 201. Thus the apparent sender from the perspective of the recipient is device 201, rather than the true sender 203.

Figure 3:
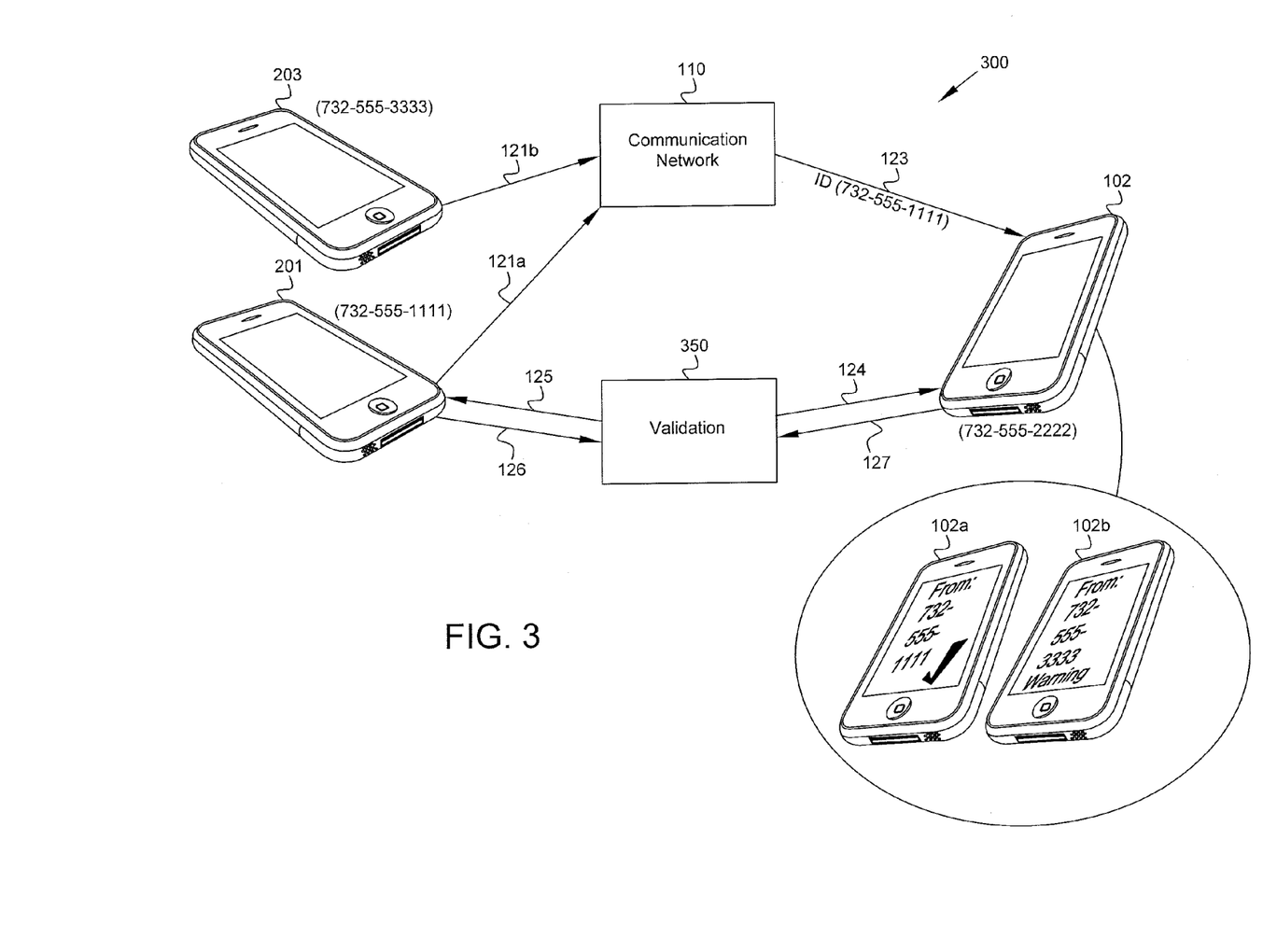
FIG. 3 is an illustration of an embodiment of the disclosed subject matter for determining the authenticity of the apparent sender.

FIG. 3 is an illustration of a system 300 for determining the authenticity of the apparent sender. The apparent sender (or indicated sender in terms of this disclosure) is the sender or device associated with the provided source identifier, whereas the true sender or actual sender is the device that originated the message/call. FIG. 3 shows both the apparent sender 201 associated with number 732-555-1111 and the true sender 203 (also referred to as spoofer device) associated with number 732-555-3333. In a non-spoofed communication, apparent sender 201 communicates its source identifier through the communication network 110 to the recipient device 102 via messages 121a and 123 respectively. The recipient device 102 upon receipt of the source identifier communicates 127 with a validation unit (or server) 350 which in turn communicates 125 with the apparent sender device 201 associated with the source identifier 732-555-1111. Where the communication network 110 utilized by the recipient device 102 and validation unit 350 are part of the same provider and/or interconnected, the communication network 110 alternatively may provide the source identifier to the validation unit 350. The validation unit 350 receives a response 126 from the apparent sender device 201 which is determined by the validation unit 350 to be the actual sender. The Validation unit 350 notifies the recipient device 102 of the authenticity as indicated by communication 124. The recipient device 102 may display the authenticity of the source identifier (caller ID) in many manners, such as a color or a check mark as shown in 102a.

If however, the message is spoofed, the actual sender device 203 associated with number 732-555-3333 provides a source identifier of apparent sender device 201 to the communication network 110 and the recipient device 102 via 121b and 123. The recipient device 102 upon receipt of the source identifier will likewise communicate 127 with validation unit 350, which as described above, will communicate 125 with the apparent sender device 201 associated with the source identifier 732-555-1111. The validation unit 350, however will receive a response 126 from the apparent sender device 201 which will in this case be determined not to be the actual sender device 203 or alternatively, the validation unit may simply determine it is unable to verify the authenticity of the sender. The Validation unit 350 notifies the recipient device 102 of the non-authenticity, or failure to authenticate). The recipient device 102 may display an actual sender identifier if available or issue a warning regarding the non-authenticity of the source identifier as shown in 102b. The Validation unit 350 in notifying the recipient device 102 may make distinctions between a failure to authenticate and a positive determination of a spoofed message as noted above, however such distinctions may not be required. The disclosed subject matter while described in term of positively determining the non-authenticity of the apparent sender, likewise is intended to disclose and encompass the failure to authenticate, for example a communication could not be established with the apparent sender device 201 or the communications network 110.

Figure 4:
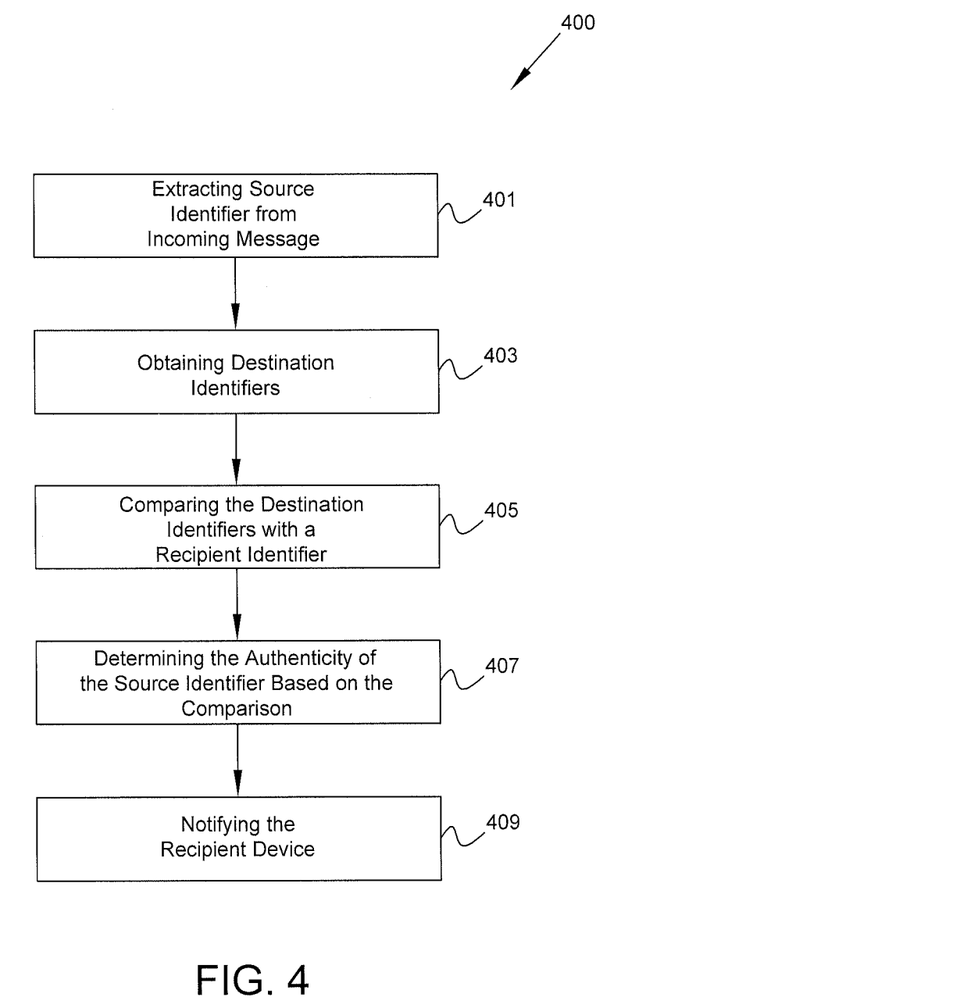
FIG. 4 is a flow diagram of an embodiment of the disclosed subject matter for determining the authenticity of the apparent sender.
Figure 6:
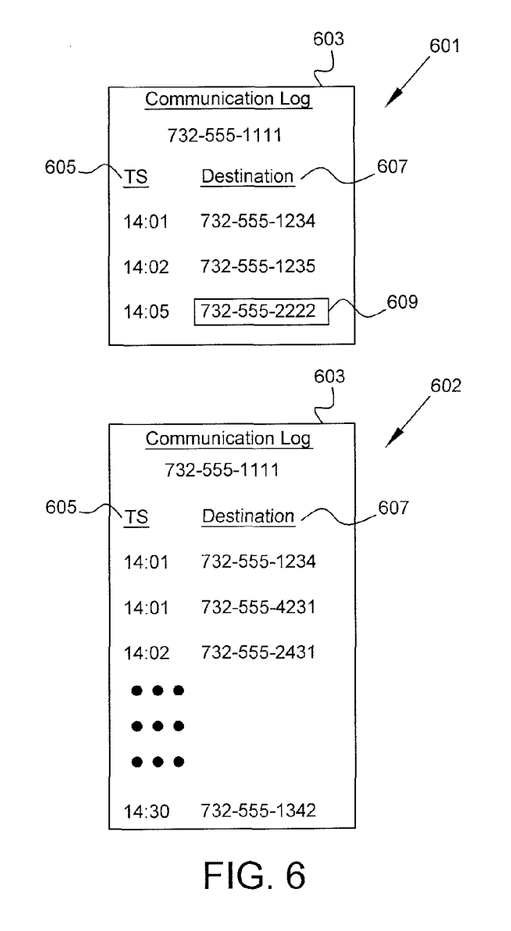
FIG. 6 is an illustration of communication logs used in an embodiment of the disclosed subject matter.

FIG. 4 shows a flow chart for a disclosed authentication/verification method 400. The source identifier is extracted from the incoming message as shown in Block 401. The extraction may be performed by an application residing on recipient device 102, or may be performed by the communication network 110. Moreover, the extraction may be automatic, via an application or operating system on the recipient device 102 or upon request of the user. Using the extracted source identifier, destination identifiers from the perspective of the apparent sender device 201 are obtained by the validation unit 350 as shown in Block 403. The destination identifier may be obtained from the communication network or the apparent sender device 201. The destination identifiers are the addresses or numbers related to communications sent from the apparent sender device 201 in a time frame reflective of when the recipient device 102 received a call. FIG. 6, as will be discussed later, illustrates communication logs that contain a list 607 of destination identifiers.

The destination identifiers are compared with a recipient identifier as shown in Block 405. The recipient identifier is the address or number of the recipient device 102, in the example of FIGS. 1-3, the recipient identifier is 732-555-2222. The authenticity of the source identifier is determined based on the comparison as shown in Block 407. If at least one of the destination identifiers match the recipient identifier, during the appropriate time frame, then the apparent sender device 201 may be authenticated. The comparison of the recipient identifiers and the destination identifiers may be performed by the validation unit 350, or alternatively may be carried out at the apparent sender device 201. The apparent sender device

201 may include an application that makes the comparison upon request of the validation unit 350 and forward its determination. Its determination may be as simple as authenticated/not authenticated, or may include the destination identifier matched with the recipient identifier and a time stamp.

The authentication is provided to the recipient device 102 as shown in Block 409. The notification may be pushed by the validation unit 350 or upon request of the user. In the case of a phone call the notification may be "out of band", meaning the notification is received over a data channel or separate phone session, or "in-band" such as a tone or series of tones. In the case of a SMS message, the notification may be "in-band" as a SMS message but distinct from the aforementioned incoming message. It is also envisioned that an application on the recipient device 102, may monitor the notification and take action of the spoofed message, such as deleting it, highlighting it, or moving it to a "spoofed" folder. For those messages authenticated, the application may also highlight the authenticated message or perform some other user specified action.

Figure 5:
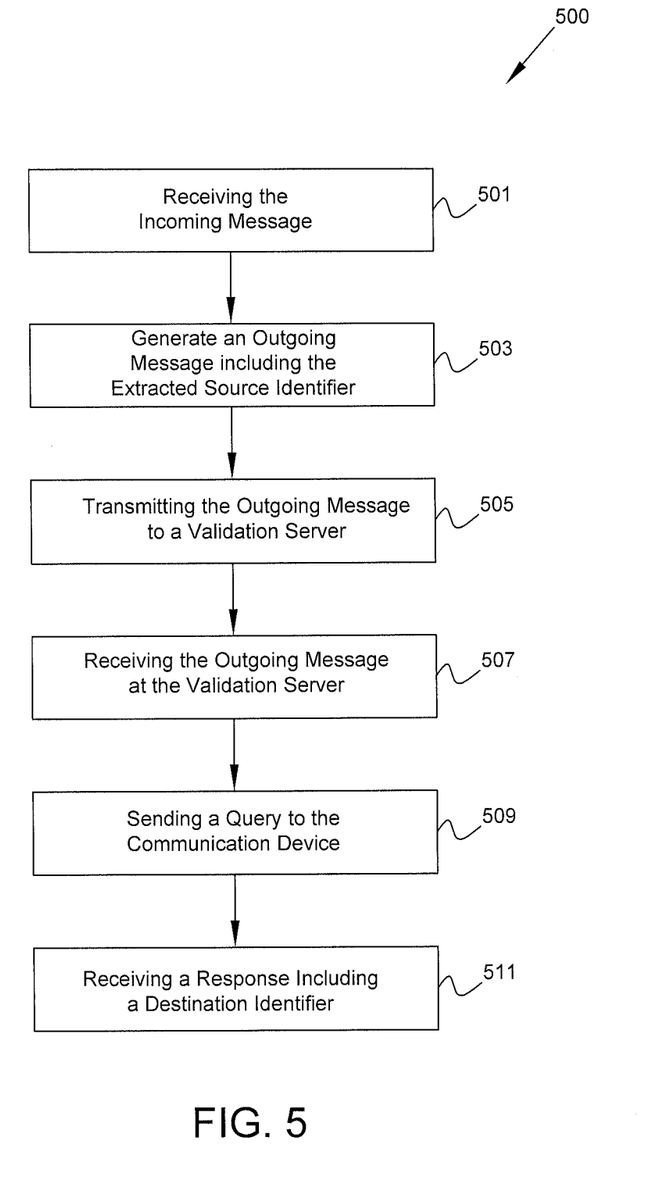
FIG. 5 is a flow diagram of an embodiment of the disclosed subject matter for obtaining destination identifiers from the apparent sender.

FIG. 5 is a flow chart depicting a method 500 describing an embodiment for obtaining the destination identifiers used in authenticating the indicated source of the message. As shown in Block 501 an incoming message is received at the recipient device 102 from which the Source Identifier is extracted. The recipient device 102 via software, such as an app or operating system, generates an outgoing validation message which includes the extracted source identifier as shown in Block 503. In addition to the source identifier, the outgoing message may also include a time stamp indicative of the time of receipt of the incoming message.

The outgoing message is transmitted to the validation unit 350 as shown in Block 505. The outgoing message is an "out-of-band" signal that does not interfere with the ongoing call or received text message. The "out-of-band" signaling is intended to be transparent to the user. The Validation unit or server receives the outgoing message in Block 507 and generates a query to the communication device associated with the extracted Source identifier as shown in Block 509. The query from the validation unit 350 may request the communication log from the apparent sender device 201 within the time frame of the time stamp, or may simply request that the apparent sender device 201 indicate whether a call was made to the recipient device 102. The query to the apparent sender 201 is preferably over a data channel.

The apparent sender device 201 responds to the query by including at least one destination identifier as shown in Block 511. The apparent sender device 201 may send the destination identifiers associated with a fixed number of recent communications that originated from the apparent sender device 201 or of the communications that fall within a time window. The response from the apparent sender device 201 may also include time stamps associated with destination identifiers as well as reference times of the apparent sender device 201, such as the time at which the query was received, the time that the response was sent from the apparent sender device 201. The reference times that are reflective of the local clock at the apparent sender 201, may be used by the validation unit 350 to effectively synchronize the times received from the apparent sender device 201 with the clocks at the validation unit 350 and recipient device 102 for a more precise comparison between the destination identifier and the recipient identifiers.

FIG. 6 illustrates a generic communication log 603 associated with the apparent sender device 201 corresponding with number 732-555-1111. The communication log, 603 whether resident on the apparent sender device 201 or the communication network 110 preferably includes a time stamp 605 and the destination identifier 607 which is the address or number to which the communication was sent.

In FIG. 6, Communication Log 601 represents the log from the actual sender device 203 of the message. Therefore, when the destination identifiers 607 within 5 minutes of 14:05 (732-555-1234, 732-555-1235 and 732-555-2222) are sent to the validation unit 350, a favorable match occurs between destination identifier 609 and the recipient identifier 732-555-2222. The validation unit 350 may then conclude the apparent sender device 201 is the actual sender of the message or call.

Communication Log 602 represents the log from the apparent sender device 201 in a spoofed call. In Communication Log 602, none of the destination identifiers 607 within the time frame match with the recipient identifier 732-555-2222 thus, the validation unit 350 may conclude the apparent sender device 201 is not the actual or true sender. As noted previously, the apparent sender device 201, if supplied with the recipient address, may also perform the comparison and report to the validation unit 350 whether or not a communication was initiated to the recipient device 102. The time period or boundary relevant to the collection of destination identifiers for phone calls may be within several seconds to a few minutes, as to allow for differences in clock synchronization and latency, yet still be occurring during the call. Whereas the relevant time period for other messages such as text messages may be longer as text messages may not require the immediate attention associated with phone calls.

Communication logs may also be retrieved from the communication network 110 used by the apparent sender device 201. For example HLR, Visiting Location Registers (VLR), VoIP proxies; PSTN databases may maintain communication logs of the apparent sender 101 for network management or billing. The validation unit 350 may alternatively query these entities for the destination identifiers associated with communications from the apparent sender device 201.

Aspects of the disclosed subject matter have been described with respect to application (Apps) operation on the communication devices, both the recipient and the source; however, it is also envisioned that these functions may also be implemented via the operation systems of the communication devices or as part of the communication networks. In addition, while the embodiments described herein show the validation unit separate from the communication network, it is also envisioned that the validation unit may be a part of the communication network and/implemented over several network elements.

Another aspect of the disclosed subject matter is the use of a hash of the actual message sent. For example with SMS, a hash of the received message may be forwarded to the apparent sender device 201, or the validation unit 350. The hash may then be compared with the messages actually sent by the apparent sender device 201, unlike phone call or voice mail, a copy of sent SMS or text messages are typically retained at the sending device. A match of the hash and the sent message would be a strong indication of the authenticity of the source identifier.

Another aspect of the disclosed subject matter involves matching entities associated with the source and recipient identifiers. In many situations, the caller ID for a person or corporation may be a single identifier, irrespective of from which device a communication is originated. For example, a person's caller ID may be same whether calling from an Office phone, cell phone or home phone. In such a case the validation unit may access a database associating the multiple devices with the single identifier and query each for a matching destination identifier.

The validation may also be based on the determination that any communication from the apparent sender device 201 corresponds in time with the message received at the recipient device 102. The validation unit 350 and the devices 201, 102 if synchronized, or deterministically offset to deal with any timing differences could match the sent time of the received message with a message sent time from the apparent sender device 201. If no message was sent from the apparent sender device 201 at a time concurrent with the time the recipient message was received, the apparent sender device 201 or the validation unit 350 could conclude the apparent sender device 201 is not authenticated. Whereas a match in sending times would indicate an authentic sender. The geographic location associated with the apparent sender may also be compared to determine the authenticity, if location information is available such as from Global Positioning System (GPS), Time of Arrival (TOA), Time Difference of Arrival (TDOA), Timing Advance "TA", E911 or other location based information.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What I claim:

1. In a communication network wherein an incoming message intended for a recipient device includes a source identifier indicating the incoming message's sender, and wherein the source identifier is subject to possible message spoofing so as to appear to originate from a sender other than the true sender, a method of determining the authenticity of the source identifier of the sender comprising:
   obtaining at least one destination identifier associated with one or more outgoing messages sent from a communication device associated with the source identifier extracted from the incoming message;
   comparing the at least one destination identifier and a recipient identifier associated with the recipient device;
   determining if the source identifier is authentic based upon the comparison; and
   notifying the recipient device of the determination;
   wherein the step of obtaining the at least one destination identifier associated with one or more outgoing messages sent from the communication device further comprises:
   receiving an outgoing message, generated at the recipient device, at the validation server; the outgoing message including a source identifier extracted from the incoming message received at the recipient device, and,
   sending from the validation server a query to the communication device associated with the source identifier and receiving a response from the communication device, wherein the response includes the at least one destination identifier.

2. The method of claim 1, wherein validation server performs the steps of:
   comparing the at least one destination identifier and the recipient identifier associated with the recipient device and determining if the source identifier is authentic based upon the comparison.

3. The method of claim 1, further comprising:
   monitoring the incoming message at the communication network to extract the source identifier and providing the source identifier and the recipient device identifier to a validation server in the communication with the network.

4. The method of claim 3, wherein the step of obtaining at least one destination identifier associated with one or more outgoing messages sent from a communication device associated with the extracted source identifier further comprises:
   accessing a communication log of the communication device associated with the extracted source identifier and retrieving the at least one destination identifier.

5. The method of claim 4, further comprising receiving at the validation server a time of receipt of the message at the communication network and the at least one destination identifier are retrieved based on the time of receipt.

6. The method of claim 4, wherein the communication log is resident and accessed by the communication device.

7. The method of claim 6, wherein the at least one destination identifier is sent from the communication device to the validation server.

8. The method of claim 7, wherein the validation server performs the comparison.

9. The method of claim 1, wherein the notification of the recipient device comprises a message sent to the recipient device.

10. The method of claim 1, wherein the comparison between the at least one destination identifier and the recipient device identifier is a match and the determination is the source identifier is authenticated.

11. The method of claim 1, wherein the comparison between the at least one destination identifier and the recipient device identifier is not a match and the determination is the source identifier is not authenticated.

12. The method of claim 1, wherein the notification of the recipient device is on a different channel than the incoming message.

13. The method of claim 1, wherein the notification of the recipient device is on the same channel as the incoming message.

14. The method of claim 1, wherein the incoming message is a telephone call or a SMS message.

15. The method of claim 1, wherein the comparison is further based on a time associated with the at least one destination identifier and another time associated with the incoming message.

16. A method of authenticating a received short message service (SMS) message is received from a sender associated with the source identifier of the received SMS message to prevent spoofing of the sender, comprising:
   extracting the source identifier from the received message;
   generating an outgoing message at the recipient device, said outgoing message including the extracted source identifier
   providing the source identifier to a validation server by sending the outgoing message from the recipient device to the validation server;
   requesting information from a communication device associated with the source identifier;
   receiving a response at the validation server from the communication device including the requested information; and,
   authenticating the source of the SMS message based on the information including at least a comparison of the requested information and a recipient identifier associated with the receiver of the SMS message;
   wherein the request includes an identification of the recipient of the SMS message and a time stamp associated with the message.

17. The method of claim 16, wherein the information includes one or more destination addresses for messages sent from the communication device at a time proximate the time stamp.

18. In a communication device operating within a communication network wherein an incoming message intended for a recipient device includes a source identifier indicating the incoming message's sender is the communication device, and wherein the source identifier is subject to possible message spoofing so as to appear to originate from a sender other than the communication device, a method of determining the authenticity of the source identifier comprising:
- receiving a first message including a recipient identifier associated with the recipient device associated with the incoming message;
- accessing a log associated with outgoing communications from the communication device which includes at least one destination identifier;
- comparing the at least one destination identifier and a recipient identifier associated with the recipient device;
- determining if the communication device is the sender of the incoming message based upon the comparison; and sending a second message intended for the recipient device including the determination;
- further comprising comparing a time value associated with the at least one destination identifier and another time value associated with the incoming message.

* * * * *